United States Patent
Shao et al.

(10) Patent No.: US 7,514,912 B2
(45) Date of Patent: Apr. 7, 2009

(54) SYSTEM AND METHOD FOR POWER CONTROLLER

(75) Inventors: Yunqi Shao, Shanghai (CN); Yuan Lin, Shanghai (CN); Jun Ye, Shanghai (CN); Lieyi Fang, Shanghai (CN)

(73) Assignee: On-Bright Electronics (Shanghai) Co. Ltd., Zhangiang Hi-Tech Park, Shanghai (CN)

( * ) Notice: Subject to any disclaimer, the term of this patent is extended or adjusted under 35 U.S.C. 154(b) by 0 days.

(21) Appl. No.: 11/750,309

(22) Filed: May 17, 2007

(65) Prior Publication Data

US 2008/0246444 A1   Oct. 9, 2008

(30) Foreign Application Priority Data

Apr. 5, 2007   (CN) .................. 2007 1 0039342

(51) Int. Cl.
*G05F 1/70* (2006.01)
*G05F 1/40* (2006.01)
(52) U.S. Cl. .................. 323/285; 323/207; 323/222
(58) Field of Classification Search .................. 323/222, 323/282, 284, 285, 351, 207, 283
See application file for complete search history.

(56) References Cited

U.S. PATENT DOCUMENTS

| | | | | |
|---|---|---|---|---|
| 6,946,819 | B2* | 9/2005 | Fagnani et al. | 323/285 |
| 7,064,527 | B2* | 6/2006 | Adragna | 323/285 |
| 7,279,876 | B2* | 10/2007 | Adragna et al. | 323/284 |
| 7,307,405 | B2* | 12/2007 | Adragna et al. | 323/285 |
| 7,397,678 | B2* | 7/2008 | Frank et al. | 323/285 |

* cited by examiner

*Primary Examiner*—Jessica Han
(74) *Attorney, Agent, or Firm*—Jones Day (57) ABSTRACT

System and method for power controller. According to an embodiment, the present invention provides a power factor correction apparatus. The apparatus includes a multiplier component that is configured to process a first input signal and a second input signal. For example, the first input signal is associated with a rectified alternating current signal, and the second input signal is associated with an error signal. The multiplier component further is configured to generate a first output signal based on the first input signal and the second input signal. The apparatus also includes a comparator component that is configured to process a third input signal and fourth input signal. The third input signal is associated with the first output signal. The comparator component is further configured to generate a second output signal based on the third input signal and the fourth input signal.

16 Claims, 9 Drawing Sheets

FIG. 1
(Conventional)

(Prior Art)

FIG. 2 (Boost Converter)

(Prior Art)

SYSTEM AND METHOD FOR POWER CONTROLLER

CROSS-REFERENCES TO RELATED APPLICATIONS

This application claims priority to Chinese Patent Application No. 200710039342.4, filed Apr. 5, 2007, commonly assigned, incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention is related to integrated circuits. More specifically, the present invention can be applied to devices used controlling power supply. According to various embodiments, the present invention provides various novel techniques for power factor correction in a power system. Merely by way of example, the present invention can be implemented in conjunction with transition mode power factor controller. It is to be appreciated that the present invention has a broad range of applications.

Since the Benjamin Franklin's discovery of electricity, a wide ranges of devices have been developed. Various electrical devices—such as light bulbs, telephones, record players, to just name a few—have change lives of human beings forever. As people rely more and more on electrical devices, the need for electricity increases dramatically. To satisfy the demand for electricity, large power generators have been built. Typically, power generators are far away from the customers who need electricity, and thus electricity need to be transferred for a large distance. With invention of inductor motor by Nikola Tesla, alternating current (AC) becomes adopted for long-distance power transmission.

One of characteristics of AC power lines has been power factor. Power factor is a function of power being delivered and power being actually consumed. For efficient transferring and usage of power, power factor correction (PFC) devices are often needed. Many regulatory bodies have imposed regulations regarding PFC. For example, the International Electrotechnical Commission (IEC) has imposed standard IEC 100-3-2, which requires electrical devices to use input stages with topologies other from a simple off-line front end which contains a bridge rectifier and capacitor. In addition, there are also various system requirements that require the use of PFC devices.

Over the past, various types of PFC devices have been developed and used. For example, various conventional PFC techniques, such as multiplier-based transition mode power factor corrector, have been developed. Unfortunately, these conventional techniques are often inadequate.

Therefore, it is desirable to have improved system and method for power factor correction controller.

BRIEF SUMMARY OF THE INVENTION

The present invention is related to integrated circuits. More specifically, the present invention can be applied to devices used controlling power supply. According to various embodiments, the present invention provides various novel techniques for power factor correction in a power system. Merely by way of example, the present invention can be implemented in conjunction with transition mode power factor controller. It is to be appreciated that the present invention has a broad range of applications.

According to an embodiment, the present invention provides a power factor correction apparatus. The apparatus includes a multiplier component that is configured to process a first input signal and a second input signal. For example, the first input signal is associated with a rectified alternating current signal, and the second input signal is associated with an error signal. The multiplier component further is configured to generate a first output signal based on the first input signal and the second input signal. The apparatus also includes a comparator component that is configured to process a third input signal and fourth input signal. The third input signal is associated with the first output signal. The comparator component is further configured to generate a second output signal based on the third input signal and the fourth input signal. Additionally, the apparatus includes a timing component that is configured to receive a fifth input signal at a first time and generate a third output signal based on the fifth input signal at a second time. Additionally, the apparatus includes a switch controller that is configured to generate a first control signal based on at least second output signal and the third output signal. The first control signal is capable of causing a switch to turn off. The fifth input signal is associated with the control signal. The time difference between the first time and the second time is predetermined based on at a characteristic of the apparatus.

According to another embodiment, the present invention provides a system for converting power. The system includes a boost apparatus, a rectifying component, and a power factor correction component. The power factor component includes a multiplier component that is configured to process a first input signal and a second input signal. The first input signal is associated with a rectified alternating current signal. The second input signal is associated with an error signal. The multiplier component is further configured to generate a first output signal based on the first input signal and the second input signal. The system also includes a comparator component that is configured to process a third input signal and fourth input signal. The third input signal is associated with the first output signal. The comparator component is further configured to generate a second output signal based on the third input signal and the fourth input signal. The system further includes a timing component that is configured to receive a fifth input at a first time and generate a third output signal based on the fifth input signal at a second time. Moreover, the system includes a switch controller that is configured to generate a first control signal based on at least second output signal and the third output signal. The first control signal is capable of causing a switch to turn off. The fifth input signal is associated with the control signal. The time difference between the first time and the second time is predetermined based on at a characteristic of the apparatus.

According to yet another embodiment, the present invention provides a method for providing power factor correction. The method includes a step for providing a multiplier component. The method also includes a step for receiving a first input signal and a second input signal by the multiplier component. The first input signal is associated with a rectified alternating current signal, and the second input signal is associated with an error signal. The method additionally includes a step for generating a first output signal based on the first input signal and the second input signal by the multiplier component. The method further includes a step for processing a third input signal and fourth input signal with a comparator. The third input signal is associated with the first output signal. Additionally, the method includes a step for generating a second output signal based on the third input signal and the fourth input signal. Moreover, the method includes a step for receiving a fifth input signal at a first time. Additionally, the method includes a step for generating a third output signal at the second time based on the fifth input signal. Also, the method includes a step for receiving the second output signal and the third output signal by a switch controller. The method further includes a step for generating a first control signal by the switch controller based on at least second output signal and the third output signal. The first control signal is capable of causing a switch to turn off. The fifth input signal is associated with the control signal. The time difference between the first time and the second time is predetermined based on at a characteristic of the apparatus.

It is to be appreciated that the present invention provides various advantages over conventional techniques. According to an embodiment, the present invention provides a more energy efficient solution as compared to conventional techniques. For example, the present invention reduces the numbers of transitions between on and off states of a power supply. According to another embodiment, the present invention offers a large window for power control and great flexibility. For example, more than one threshold voltage threshold values are used in determining various states of the power supply. There are other benefits as well.

Various additional objects, features and advantages of the present invention can be more fully appreciated with reference to the detailed description and the accompanying drawings that follow.

DETAILED DESCRIPTION OF THE INVENTION

The present invention is related to integrated circuits. More specifically, the present invention can be applied to devices used controlling power supply. According to various embodiments, the present invention provides various novel techniques for power factor correction in a power system. Merely by way of example, the present invention can be implemented in conjunction with transition mode power factor controller. It is to be appreciated that the present invention has a broad range of applications.

As explained above, controllers for providing proper power correction factor is often needed for power systems. To further articulate various principles for the present invention, a detailed discussion is provided below.

In order to obtain the maximum power from an existing circuit in a building, the power factor is usually critical. Typically, the real power available from such a circuit is may be expressed according to the following equation.

$$P_{real} = V_{rms} \times I_{rms} \times PF \quad \text{(Equation 1)}$$

As illustrated by Equation 1, the real power available is a function of root mean square (RMS) voltage, RMS current, and corresponding power factor. As an example, a typical off-line converter has a power factor in a range between 0.5 to 0.6, which means that for a given circuit breaker rating only 50% to 60% of the maximum power is available for utilization. To obtain the maximum power available, the power factor needs to be equal to unity.

Unity power factor is defined as the current waveform being in phase with the voltage, and undistorted. Usually, there are two main sources of power factor degradation: phase shift and distortion.

Phase shift is typically due to reactive loads. For example, when reactive loads are present, power factor may be determined according to the following equation.

$$PF = \cos \theta \quad \text{(Equation 2)}$$

As illustrated by Equation 2, power factor is associated with the phase angle "θ" between the voltage and the current.

Distortion, another source of power factor degradation as explained above, is often due to a variety of factors and therefore is difficult to analyze. Usually, effects of distortions on power factor are measured by AC analyzers and/or circuit simulation programs. Depending on specific applications and circumstances, there are many potential causes that could lead to distortion. One of the major causes of distortion is rectification of a power line into a capacitive filter. For example, the process causes current spikes that do not follow the input voltage waveform. To compensate, a power converter that is implemented with PFC component forces the current to follow the input waveform, thereby reducing peak and RMS currents, and eliminating phase shifts.

Important as it is, there are many ways for providing PFC. As an example, PFC devices can be classified into two categories: passive input circuit and active input circuit. Passive input circuits usually contain a combination of large capacitors, inductors, and rectifiers that operates at the AC line frequency. In comparison, active input circuits incorporate some form of a high frequency switching converter for the power processing.

Figure 1:
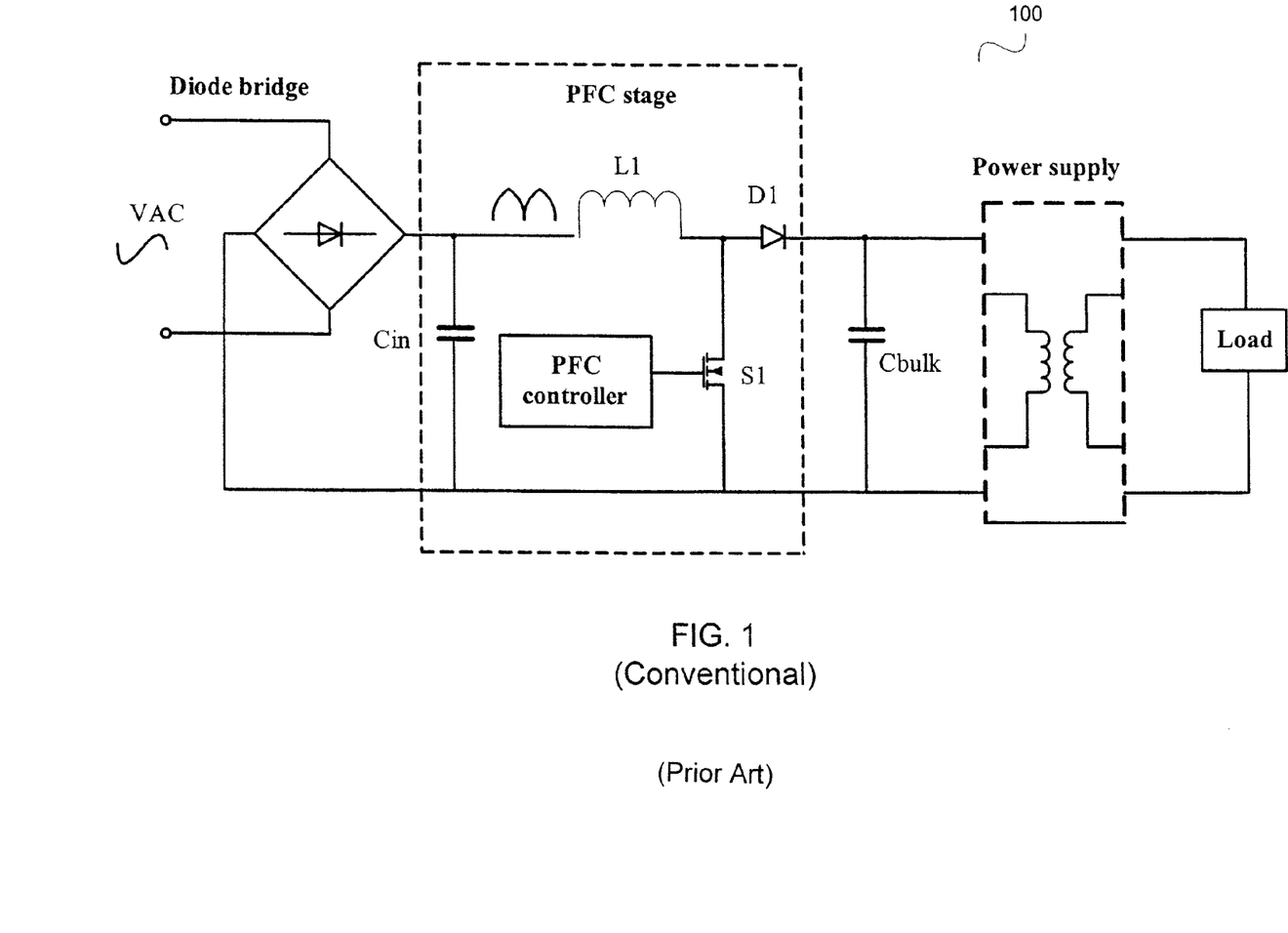
FIG. 1 is a simplified diagram illustrating a conventional active input circuit for power factor correction.

FIG. 1 is a simplified diagram illustrating a conventional active input circuit for power factor correction. As shown in FIG. 1, an active circuit 100 includes a diode bridge, a PFC stage, and a power supply. As an example, the active circuit 100 is implemented with boost converter, which is one of the most popular topologies used for PFC. Boost topology is typically flexible and is operable in many power modes. For example, boost topology is capable of operating in continuous conduction mode (CCM), discontinuous conduction mode (DCM), and/or transition mode (TM).

Active input circuits offer various advantages over passive input circuits. Operating frequencies that are much higher than the frequency of AC power line, active input circuits are usually lighter, smaller, and more efficient in comparison to passive input circuits.

Transition mode PFC circuit is widely used in low-to-medium power applications due to its system simplicity. Typically, TM PFC circuits can be implemented according to one of these two techniques: (1) time-based TM PFC and (2) multiplier-based TM PFC. Usually, the two techniques are considered functionally equivalent. For example, through algebra analysis, it can be illustrated that the two techniques offer substantially the same level of performance.

As an example, multiplier-based active input circuits may be implemented with preconverter unit along with other components. With proper control of preconverter in active input circuits, almost any complex load can be made to appear resistive to AC power lines, thereby significantly reducing the harmonic current content in power transfer.

Figure 2:
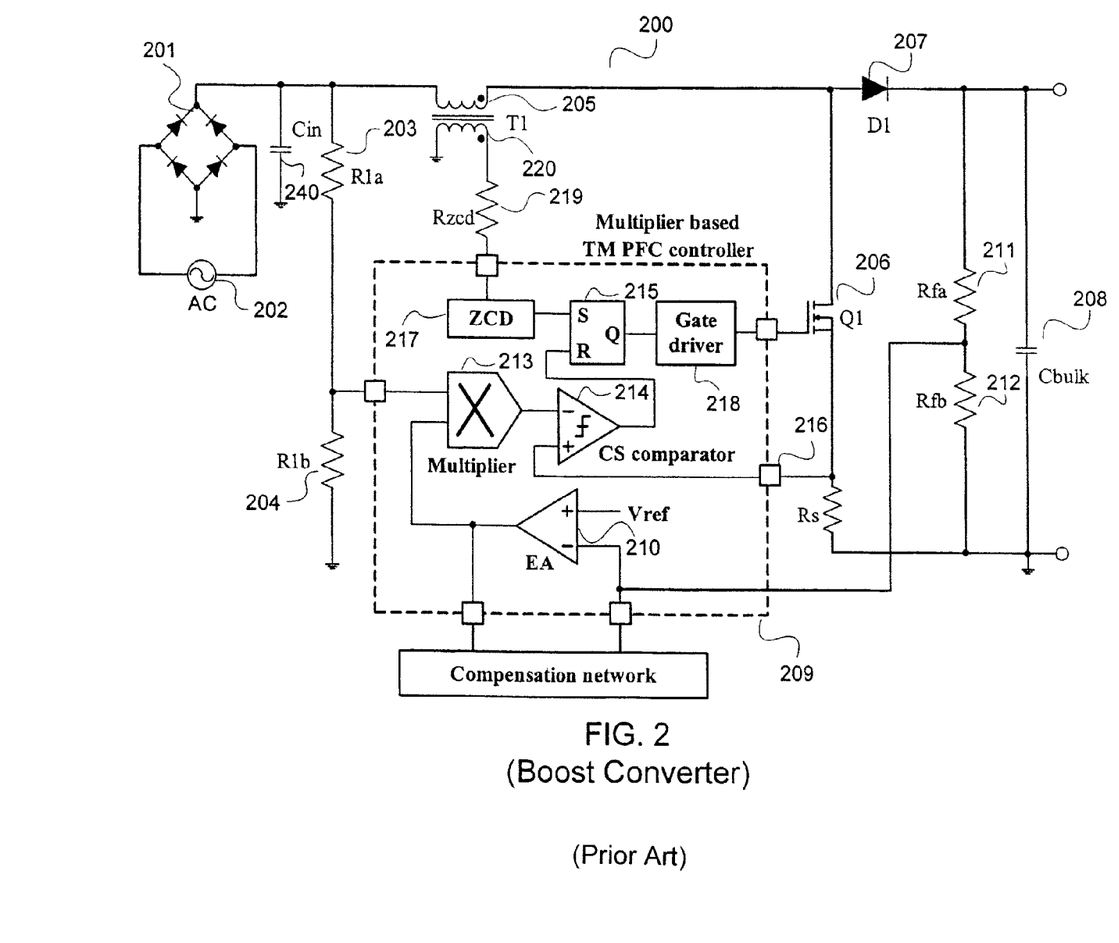
FIG. 2 is a simplified diagram illustrating conventional transition mode power factor correction controller implemented with a boost preconverter.

FIG. 2 is a simplified diagram illustrating conventional transition mode power factor correction controller implemented with a boost preconverter. As shown in FIG. 2, a system 200 includes a diode bridge 201 that is used to rectify current from the AC source 202. As an example, the system 200 is used for providing pulse-width modulation (PWM). The current rectified by the diode bridge 201 is then provided to a voltage divider, which consists of resistors 203 and 204. As an example, switching technique is used to boosts the rectified input voltage into a regulated DC output voltage.

The system 200 includes a boost converter, which consists of an inductor 205, a switch 206, a diode 207, an output capacitor 208, and a control component 209. The function of the control converter is to shape the input current before the diode bridge in a sinusoidal fashion, in phase with the input sinusoidal voltage.

An error amplifier (EA) 210 compares two inputs: (1) a partition of the output voltage of the boost converter through a voltage divider which is implemented using resistors 211 and 212, and (2) an internal reference voltage Vref. The EA is configured to generate an error signal that is proportional to the difference between the two inputs. For example, if the bandwidth of the error amplifier is narrow enough (e.g., below 20 Hz), the error signal is a DC value over a given half-cycle.

The error signal is provided to a multiplier component 213. As shown, the multiplier 213 is configured to multiply the error signal by a portion of the rectified voltage. As an example, the output from the multiplier 213 is a rectified sinusoid voltage whose peak amplitude is associated with the peak of the rectified voltage and the value of the error signal.

The output from the multiplier 213 is provided as one of the inputs for a comparator (e.g., current sensing comparator) 214. For example, the output from the multiplier 213 represents a sinusoidal reference for pulse-width modulation. In addition to the output from the multiplier 213, the comparator 214 also receive an input from a node 216. In certain implementations, when the comparator 214 determines that the voltage on the two inputs are equal, the comparator 214 causes the flip-flop 215 to reset and the switch 206 to turn off.

After processing by the control component 209, the peak inductor current of the system 200 is enveloped by a rectified sinusoidal waveform. For example, it can be shown that the processing by the control component 209 produces a constant ON-time over each line half-cycle.

After the switch 206 is turned off, the diode 207 is forward biased due to current continuity. As a part of the boost topology, the inductor 205 will discharge its stored energy into the load of the system 200. When the inductor 205 drops to zero, the zero current detector 217 detects the zero current from the resistor 219 and the coupling transformer 220. The output of the zero current detector 217 is connected to the "set" input terminal of the flip-flop 215. When the zero current detector 217 detects the zero current, the zero current detector 217 causes the flip-flop 215 to be set. When the flip-flop 215 is set, the output of the flip-flop 215 turns on the switch 206. During the operation of the system 200, the flip-flop 215 is set and reset based voltage from the AC source 202.

Figure 3:
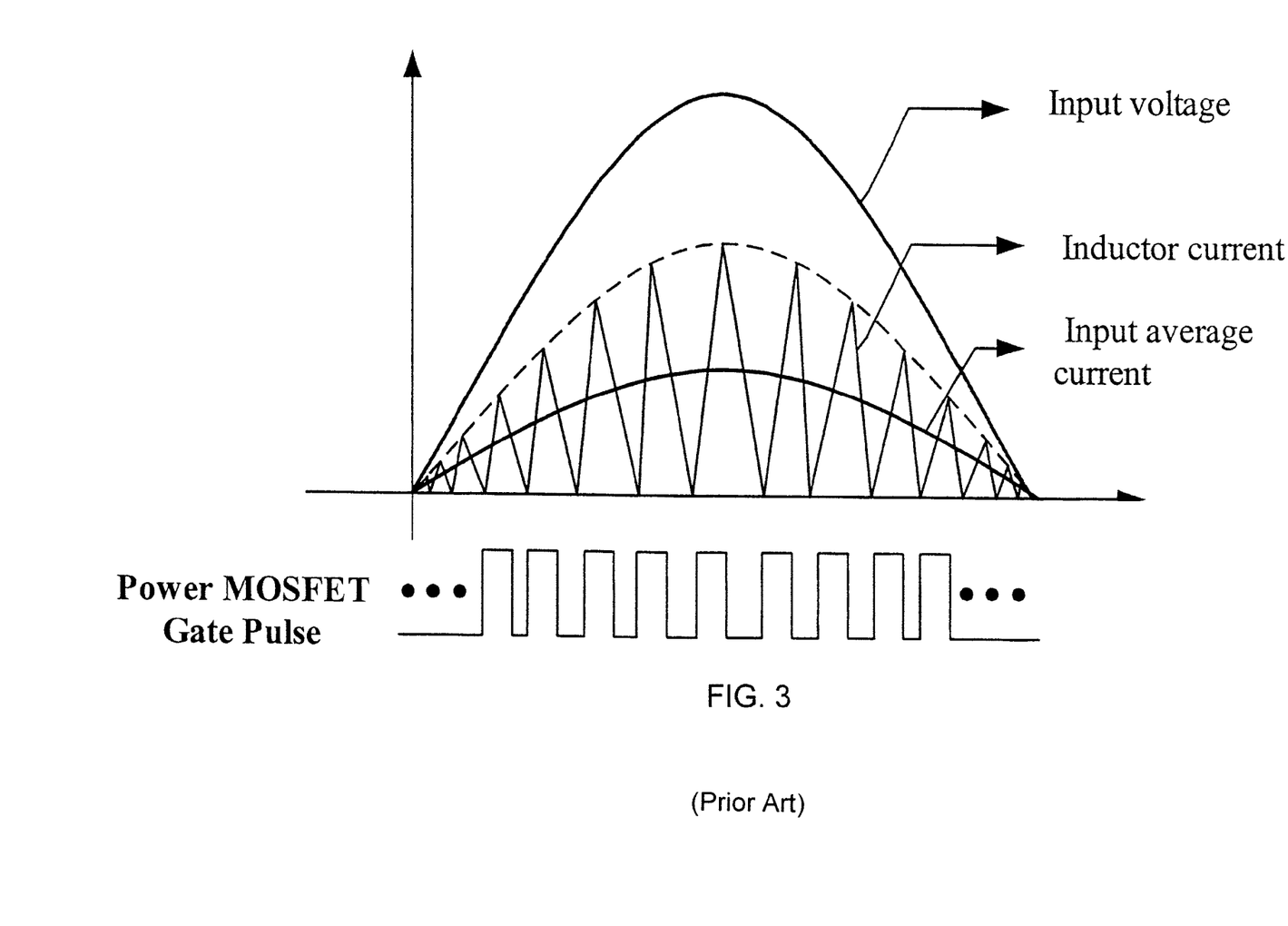
FIG. 3 is a graph illustrating various waveforms associated with a convention converter system.

FIG. 3 is a graph illustrating various waveforms associated with a convention converter system. As shown in FIG. 3, the input average current is one-half of the peak inductor current. For example, the system operates approximately between continuous and discontinuous mode.

From the waveforms of FIG. 3, it may be shown that a multiplier-based transition mode PFC system operates in essentially the same way as a time-based transition mode PFC system.

Conventional PFC systems are useful in numerous ways. Unfortunately, these PFC systems also have certain drawbacks. For example, conventional transition mode PFC often generates audio noise under certain situations, such as when the system is fully loaded. For example, when a PFC system is operating at high input average (RMS) voltage (e.g., 90 volts AC), the system often suffers from cusp distortion.

Usually, cusp distortion occurs during the transition of the AC voltage. More specifically, cusp distortion often takes place when the AC voltage drops below near zero volt. When the AC voltage drops below near zero volt, the diodes at the diode bridges are reverse biased due to residual holdup voltage, which is associated with filter capacitor (e.g., capacitor 240 in FIG. 2) and the diode bridge.

Typically, the residual voltage at the filter capacitor is related to loading of the system. For example, the residual voltage at the filter capacitor is inversely related to loading of the system (i.e., the heavier the loading, the smaller residual hold up voltage, and vice versa). The residual voltage at the filter capacitor is also related to random offset voltages of various components (e.g., offset voltages of the multiplier, comparator, etc.) of the PFC system. For example, if the equivalent offset voltage that is attributed to multiplier and/or CS comparator at the output of multiplier is positive, when the input AC line voltage is near zero, the forced switching by offset voltage increases the equivalent loading for a period of time. Depending on the specific equivalent offset voltage, offset voltages may aggravate or alleviate cusp distortion.

When the input AC line voltage is near zero and/or drops blow zero, the voltage on the filter capacitor usually deviates from its ideal value for a short period of time.

Figure 4:
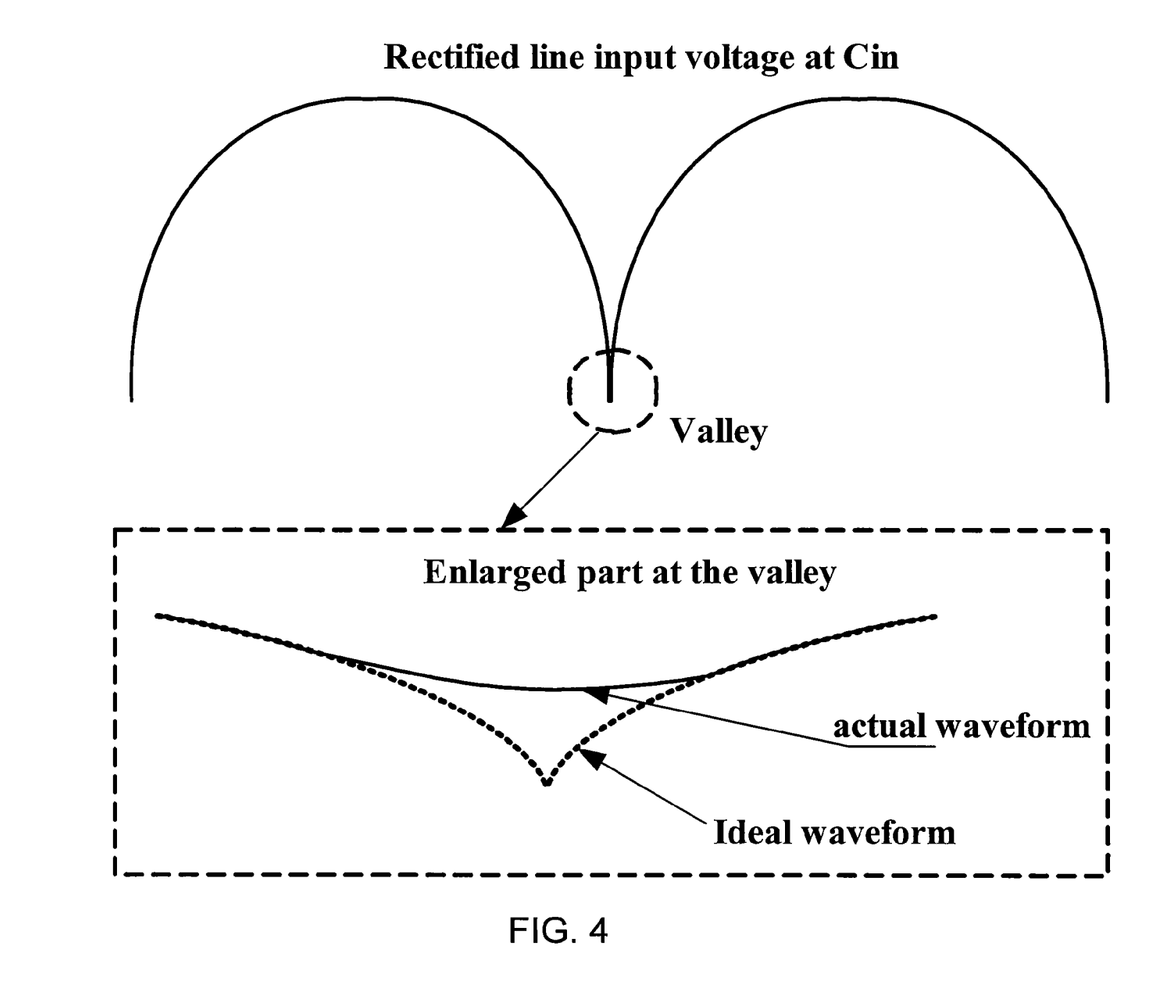
FIG. 4 is a simplified diagram illustrating waveforms related to filter capacitor voltages.

FIG. 4 is a simplified diagram illustrating waveforms related to filter capacitor voltages. As shown in FIG. 4, the measured waveform for rectified line input voltage at the filter capacitor is different from the ideal waveform. For example, at the "valley" region, the waveform deviates from its ideal shape.

In addition during the period when the diode bridge is reverse biased, cusp distortion often occurs. During this period, there is no AC line input current coming out from the diode bridge. As a result, waveforms for rectified line voltage and input current may exhibit effects of cusp distortion.

Figure 5:
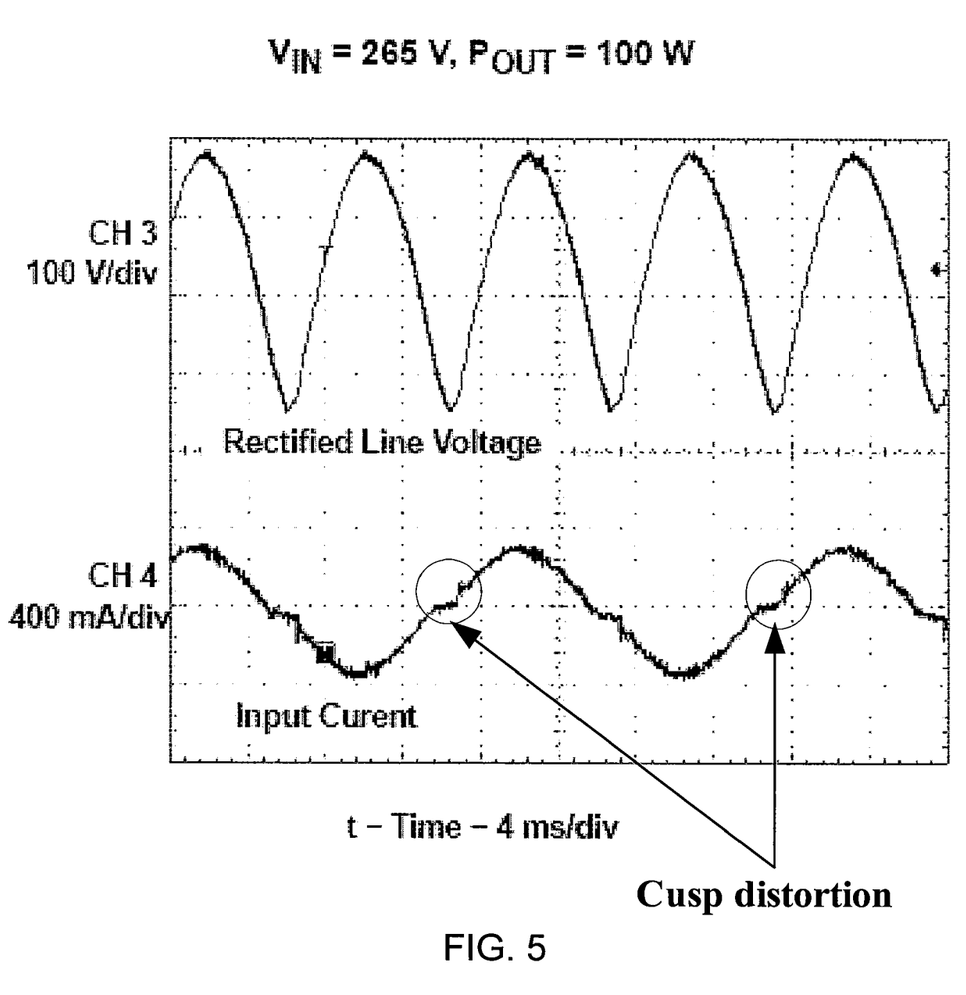
FIG. 5 is a simplified diagram illustrating measured waveforms showing effects of cusp distortion.

FIG. 5 is a simplified diagram illustrating measured waveforms showing effects of cusp distortion.

In conventional TM PFC controllers, in order to decrease the effect of cusp distortion and the random offset of multiplier, various compensating components are utilized. For example, total harmonic distortion (THD) optimizer used to compensate effects of cusp distortion and random offsets of multiplier in a TM PFC controller.

Figure 6:
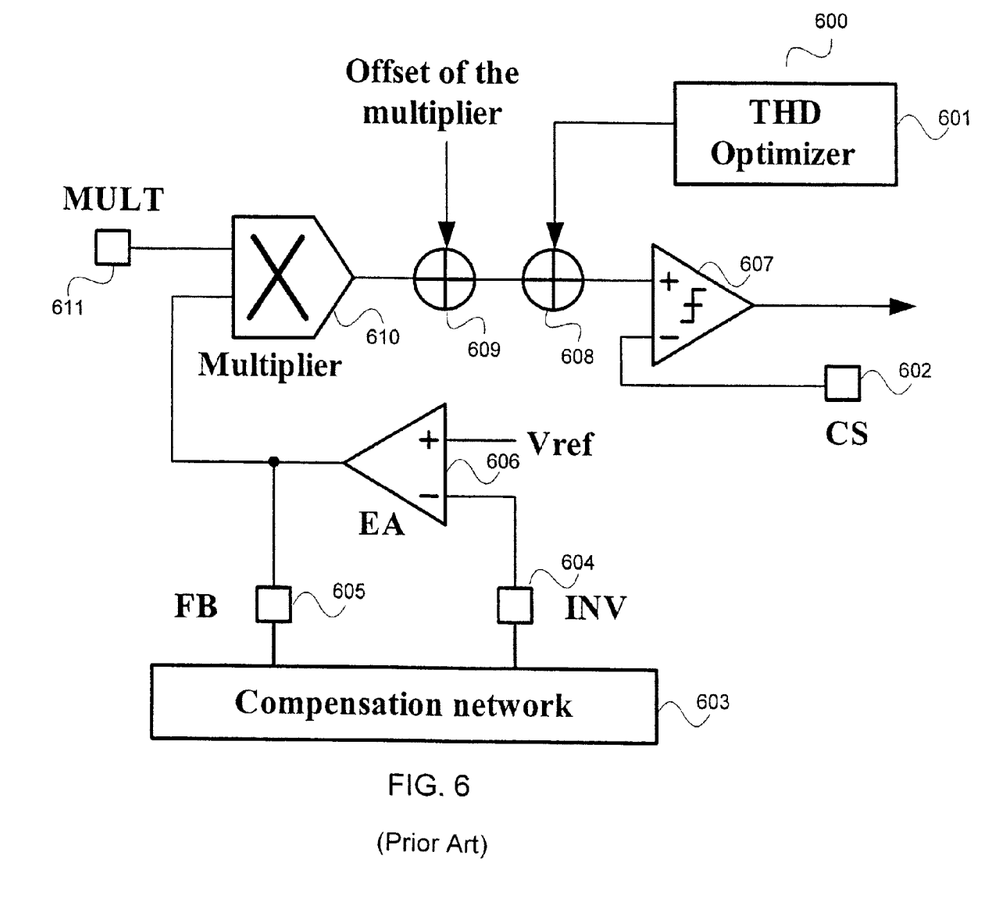
FIG. 6 is a simplified diagram illustrating a conventional multiplier system that is used for power factor correction.

FIG. 6 is a simplified diagram illustrating a conventional multiplier system that is used for power factor correction. As shown, a THD optimizer 601 is a part of a multiplier system 600. Placed between the output of a multiplier 610 and the input of a comparator 607, the THD optimizer 601 is used to optimize the output of the multiplier 610 by varying the multiplier output based on inputs (i.e., inputs 611 and 605) of the multiplier 610. For example, when the both of the two inputs of the multiplier 610 are high, the output of THD optimizer is small, since in this situation there is no need for THD optimization because of large CS peak current. On the other hand, when either input of the multiplier 610 is low, the output of THD optimizer 601 is large in order to provide adequate compensation. Typically, cusp distortion can be reduced and/or eliminated by the THD optimizer 601.

As explained above, THD optimizers are effective in, among other things, reducing cusp distortion. Unfortunately, THD optimizers often introduce unwanted audio noises during its operation. In certain situation, when line input RMS voltage is low (e.g., at 90 volt AC), the waveform for the transient hold up voltage of the filter resistor is at the valley region (as shown in FIG. 4), and the time for switching on is usually long due to the THD optimizer and/or multiplier random offset. Typically, problems associated with distortion and/or audible noise are in their worst case at 90 volts AC. For example, at 90 volts AC and the system being fully loaded, the hold voltage at the filter capacitor is at a minimum value. In addition, low hold voltage level at the filter capacitor causes low slew rate. As a result, although the theoretical on time for TM PFC devices is constant, the actual on time is often much larger. In addition, the resulting switching frequency often drops to audible frequency range, thereby producing audible noise.

Therefore, it is to be appreciated that embodiments of the present invention provides a system and method for reduce and/or eliminate audible noise for power factor correction devices.

Figure 7:
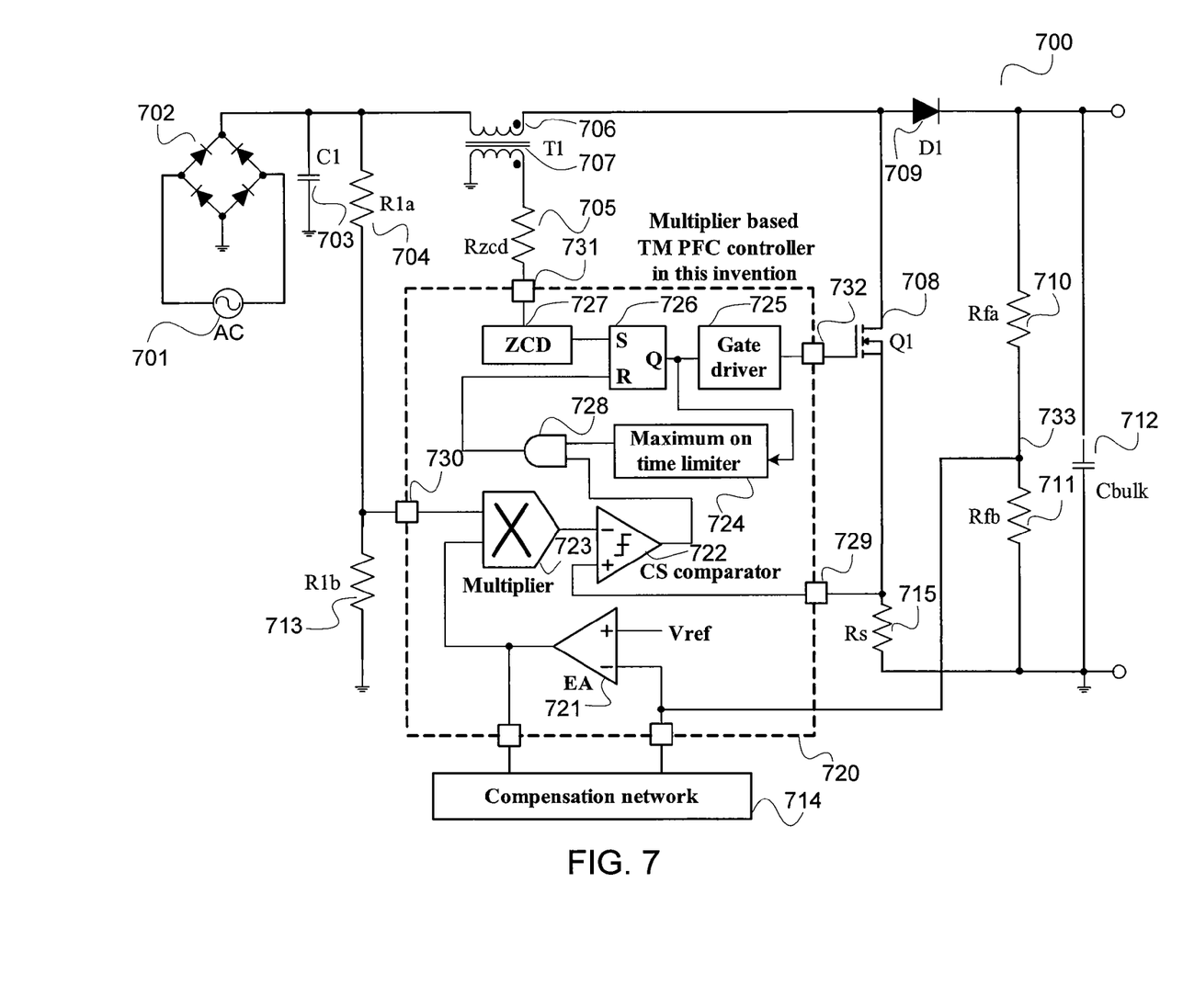
FIG. 7 is a simplified diagram illustrating a power converter implemented with a power factor correction system according to an embodiment of the present invention.

FIG. 7 is a simplified diagram illustrating a power converter implemented with a power factor correction system according to an embodiment of the present invention. This diagram is merely an example, which should not unduly limit the scope of the claims. One of ordinary skill in the art would recognize many variations, alternatives, and modifications.

As shown in FIG. 7, a power converter 700 is connected to an AC source 701. The power converter 700 is to convert input AC voltage to desired DC voltage. The power convert 700 is implemented with a boost topology and a PFC system 720. As an example, the PFC system 720 includes a multiplier-based transition mode PFC controller.

The power converter 700 is electrically coupled to an AC source 701, whose voltage is rectified by the diode bridge 702. The rectified voltage is then modified by the capacitor 703 and inductor 706. Power factor correction is performed by the controller 720.

The controller 720 performs power factor correction by using, among other things, a multiplier. The operation of the controller 720 is based on electrical properties (e.g., voltage, current level, phase, etc.) of terminals 729, 733, 730, and 731. Based on these electrical properties, the controller 720 generates a control signal, which is capable of causing a switch 708 to be turned on or off. For example, the switch 708 is implemented with a power MOSFET, but it is understood that the switch 708 may be implemented with other types of electrical devices, such as bipolar junction transistor, etc.

The controller 720 includes, among other things, the following components.

1. an error amplifier 721;
2. a multiplier 723;
3. a comparator 722;
4. a timing component 724;
5. an AND gate 728;
6. a zero current detector 727;
7. an RS flip-flop 726; and
8. a gate driver 725.

An error amplifier (EA) 721 is electrically coupled to the terminal 733 and compares two inputs: (1) a partition of the output voltage of the boost converter, and (2) an internal reference voltage Vref. As an example, the terminal 733 is connected to a voltage divider, which is implemented using resistors 710 and 711. The EA is configured to generate an error signal that is proportional to the difference between the two inputs. For example, if the bandwidth of the error amplifier is narrow enough (e.g., below 20 Hz), the error signal is a DC value over a given half-cycle.

The error signal is provided to a multiplier 723. As shown, the multiplier 723 is configured to multiply the error signal by a portion of the rectified voltage, which is provided at the terminal 730. As an example, the output from the multiplier 723 is a rectified sinusoid voltage whose peak amplitude that is associated with the peak of the rectified voltage and the value of the error signal.

The output from the multiplier 723 is provided as one of the inputs for a comparator (e.g., current sensing comparator) 722. For example, the output from the multiplier 723 represents a sinusoidal reference for pulse-width modulation. In addition to the output from the multiplier 723, the comparator 722 also receive an input from the terminal 729.

The output of the comparator 722 is provided to the AND gate 728. The AND gate 728 receives two inputs: one from the comparator 722 and the other from the timing component 724. The output of the AND gate 728 provides to the flip-flop 726. For example, a "1" signal from the AND gate causes the flip-flop 726 to reset, which in tern causes the switch 708 to be turned off.

The timing component 724 receives the output of the flip-flop 726 as an input. For example, the timing component 724 is designed to limit the maximum amount of the time that switch 708 is turned on. For example, the timing component 724, through the flip-flop 724, is capable of causing the switch 708 to be turned off. According to an embodiment, the maximum "on" time is set to be below the audio noise restrained magnitude. For example, by reducing the maximum "on" time, the frequency of resulting waveform is increased to a level above audible frequency.

Figure 8:
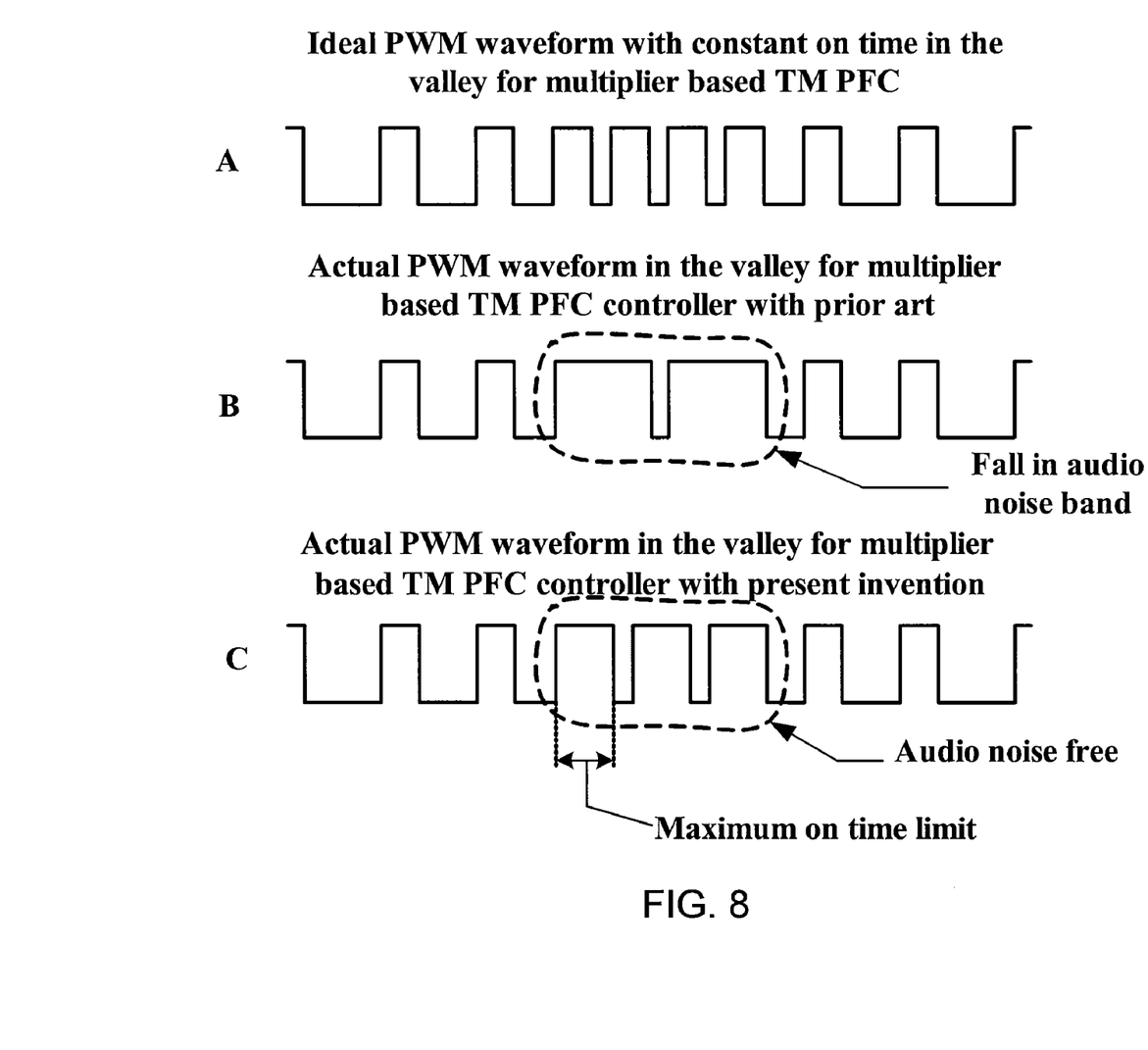
FIG. 8 is a simplified diagram illustrating PWM waveforms generated by power converters.

FIG. 8 is a simplified diagram illustrating PWM waveforms generated by power converters. This diagram is merely an example, which should not unduly limit the scope of the claims. One of ordinary skill in the art would recognize many variations, alternatives, and modifications. As shown, an ideal PWM waveform "A" exhibit nearly constant switching "ON" time, and the frequency is below audible level. In comparison, the actual frequency shown as waveform "B" deviates from ideal frequency sometimes. For example, due to operation of the multiplier, on certain occasions the time periods of "on" state is prolonged. As a result, the waveform may drop to audible frequency band.

Waveform "C" as shown in FIG. 8 illustrates a waveform according to PWM output of a power converter system according to embodiments of the present invention. In a system according to the present invention, the multiplier has the potential to prolong the "on" state. However, the timing component of the present invention limits the maximum "on" time, thereby guaranteeing that the switching frequency is almost higher than the audible frequency.

Now referring back to FIG. 7. After processing by the control component 720, the peak inductor current of the system 700 is enveloped by a rectified sinusoidal waveform. For example, it can be shown that the processing by the control component 720 produces an essentially constant ON-time over each line half-cycle. As explained above and illustrated according FIG. 8, the "on" time according to the embodiment is less than a threshold "on" time that would cause audible noise.

After the switch 708 is turned off, the diode 709 is forward biased due to current continuity. As a part of the boost topology, the inductor 706 will discharge its stored energy into the load of the system 700. When the inductor 706 drops to zero, the zero current detector 727 detects the zero current from the terminal 731, which reflects current at the resistor 705 and the coupling transformer 707. The output of the zero current detector 727 is connected to the "set" input terminal of the RS flip-flop 726. When the zero current detector 727 detects the zero current, the zero current detector 727 causes the flip-flop 726 to be set. When the flip-flop 726 is set, the output of the flip-flop 726 turns on the switch 708 through the gate driver 725. During the operation of the system 700, the RS flip-flop 726 is set and reset based on the voltage from the AC source 701.

Figure 9:
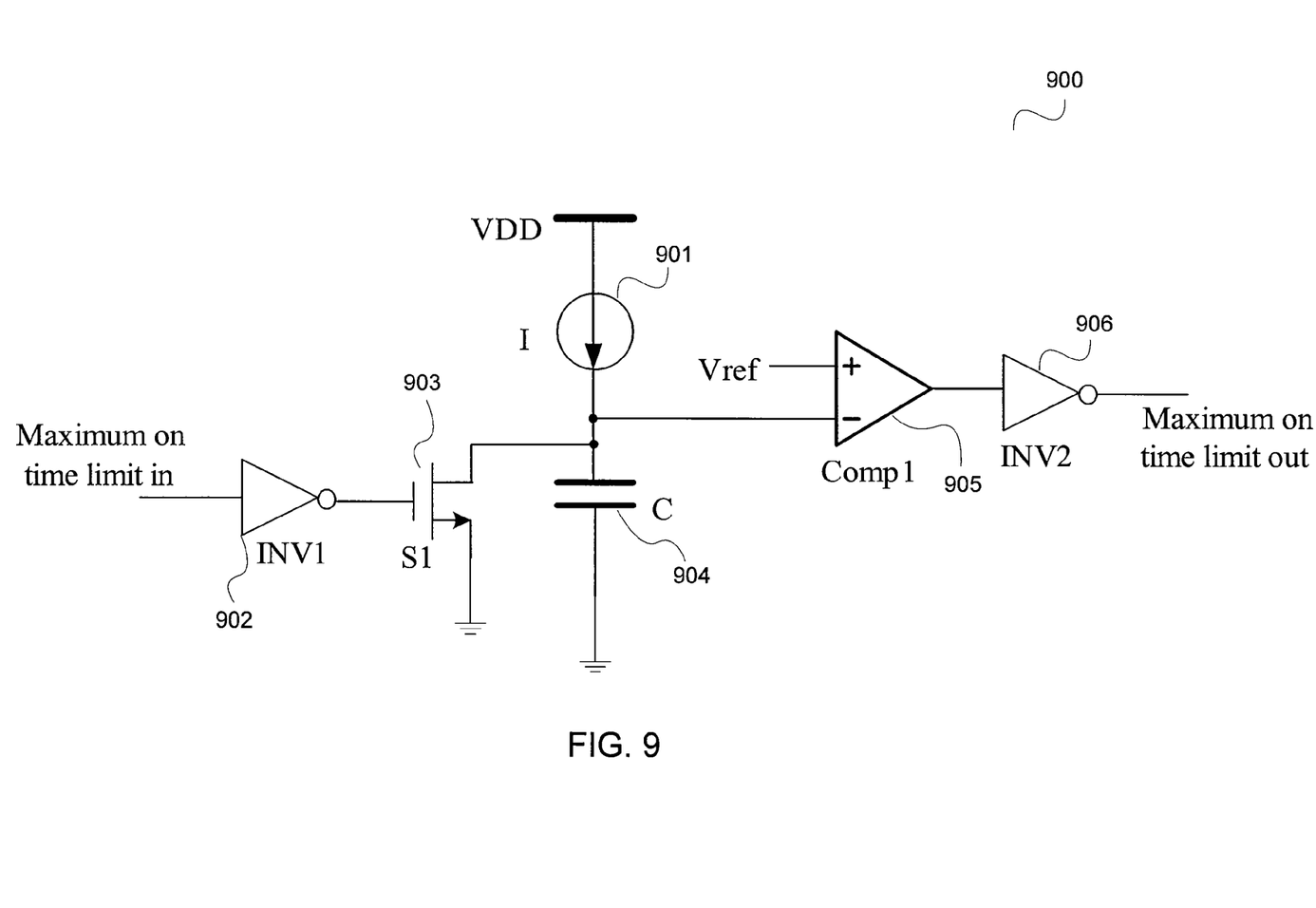
FIG. 9 is a simplified diagram illustrating a timing component according to an embodiment of the present invention.

The timing component may be implemented in various ways. For example, the timing component may be simply implemented using RC components. According to an embodiment, the timing component is implemented using a delay cell. FIG. 9 is a simplified diagram illustrating a timing component according to an embodiment of the present invention. This diagram is merely an example, which should not unduly limit the scope of the claims. One of ordinary skill in the art would recognize many variations, alternatives, and modifications.

As shown in FIG. 9, a timing component according to an embodiment of the present invention includes the following components.

1. a current source 901;
2. an inverter 902;
3. a switch 903;
4. a capacitor 904;
5. a comparator 905; and
6. an inverter 906.

According to various embodiments, the capacitor 904 providing timing for the timing component. For example, when switch 903 is turned off, the current source 901 charges the capacitor 904. When the voltage of the capacitor 904 ramps up to a threshold voltage (i.e., Vref voltage) due charge accumulation, the output of the comparator 905 changes from one to zero, which is a non-zero output at the output of inverter 906 after the output of the comparator 905 is inverted.

To further illustrate the principle of operation for the timing component, the following equation is provided.

$$T_{\text{max on time}} = \frac{Vref \cdot C}{I} \quad \text{(Equation 3)}$$

According to Equation 3, the maximum "on" time that is being tracked by the timing component 900 is related to both the voltage Vref, current level, and the size of the capacitor. Depending upon application, each of the abovementioned three parameters can be adjusted to suit the specific need. For example, the capacitance of the capacitor may be adjusted to ensure that the $T_{\text{max on time}}$ is less than the threshold "on" time that could cause audible noise.

It is to be understood that embodiments of the present invention is flexibility implemented. For example, various components of the timing component may be implemented using different electrical devices. For example, the switch 903 in FIG. 9 may be implemented by different types of transistors, such as MOSFET, BJT, etc. Similarly, other components in FIG. 9, such as the comparator 905 and the inverters may be implemented with other types of devise as well.

According to an embodiment, the present invention provides a power factor correction apparatus. The apparatus includes a multiplier component that is configured to process a first input signal and a second input signal. For example, the first input signal is associated with a rectified alternating current signal, and the second input signal is associated with an error signal. The multiplier component further is configured to generate a first output signal based on the first input signal and the second input signal. The apparatus also includes a comparator component that is configured to process a third input signal and fourth input signal. The third input signal is associated with the first output signal. The comparator component is further configured to generate a second output signal based on the third input signal and the fourth input signal. Additionally, the apparatus includes a timing component that is configured to receive a fifth input signal at a first time and generate a third output signal based on the fifth input signal at a second time. Additionally, the apparatus includes a switch controller that is configured to generate a first control signal based on at least second output signal and the third output signal. The first control signal is capable of causing a switch to turn off. The fifth input signal is associated with the control signal. The time difference between the first time and the second time is predetermined based on at a characteristic of the apparatus. For example, the apparatus may be illustrated according to FIG. 7.

According to another embodiment, the present invention provides a system for converting power. The system includes a boost apparatus, a rectifying component, and a power factor correction component. The power factor component includes a multiplier component that is configured to process a first input signal and a second input signal. The first input signal is associated with a rectified alternating current signal. The second input signal is associated with an error signal. The multiplier component is further configured to generate a first output signal based on the first input signal and the second input signal. The system also includes a comparator component that is configured to process a third input signal and fourth input signal. The third input signal is associated with the first output signal. The comparator component is further configured to generate a second output signal based on the third input signal and the fourth input signal. The system further includes a timing component that is configured to receive a fifth input at a first time and generate a third output signal based on the fifth input signal at a second time. Moreover, the system includes a switch controller that is configured to generate a first control signal based on at least second output signal and the third output signal. The first control signal is capable of causing a switch to turn off. The fifth input signal is associated with the control signal. The time difference between the first time and the second time is predetermined based on at a characteristic of the apparatus. For example, the apparatus may be illustrated according to FIG. 7.

According to yet another embodiment, the present invention provides a method for providing power factor correction. The method includes a step for providing a multiplier component. The method also includes a step for receiving a first input signal and a second input signal by the multiplier component. The first input signal is associated with a rectified alternating current signal, and the second input signal is associated with an error signal. The method additionally includes a step for generating a first output signal based on the first input signal and the second input signal by the multiplier component. The method further includes a step for processing a third input signal and fourth input signal with a comparator. The third input signal is associated with the first output signal. Additionally, the method includes a step for generating a second output signal based on the third input signal and the fourth input signal. Moreover, the method includes a step for receiving a fifth input signal at a first time. Additionally, the method includes a step for generating a third output signal at second time based on the fifth input signal. Also, the method includes a step for receiving the second output signal and the third output signal by a switch controller. The method further includes a step for generating a first control signal by the switch controller based on at least the second output signal and the third output signal. The first control signal is capable of causing a switch to turn off. The fifth input signal is associated with the control signal. The time difference between the first time and the second time is predetermined based on at a characteristic of the apparatus. For example, the apparatus may be illustrated according to FIGS. 7 and 9.

It is to be appreciated that the present invention provides various advantages over conventional techniques. According to an embodiment, the present invention provides a more energy efficient solution as compared to conventional techniques. For example, the present invention reduces the numbers of transitions between on and off states of a power supply. According to another embodiment, the present invention offers a large window for power control and great flexibility. For example, more than one threshold voltage threshold values are used in determining various states of the power supply. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A power factor correction apparatus, the apparatus comprising:
   a multiplier component being configured to receive a first input signal and a second input signal and generate a first output signal based on at least information associated with the first input signal and the second input signal, the first input signal being associated with a rectified AC signal;
   a comparator component being configured to receive the first output signal and a third input signal and generate a second output signal based on at least information associated with the first output signal and the third input signal;
   a timing component being configured to receive a fourth input signal at a first time from a flip-flop component and generate a third output signal at a second time based on at least information associated with the fourth input signal;
   an AND gate being configured to receive the second output signal and the third output signal and generate a fourth output signal based on at least information associated with the second output signal and the third output signal;
   a zero current detector being configured to receive a fifth input signal and generate a fifth output signal based on at least information associated with the fifth input signal;
   the flip-flop component being configured to receive the fourth output signal at a first terminal and the fifth output signal at a second terminal and output a sixth output signal at a third terminal;
   a driver component being configured to receive the sixth output signal and output a seventh output signal, the seventh output signal being at least capable of causing a switch to be turned off;
   wherein:
      a time difference between the first time and the second time is predetermined based on at least a characteristic of the apparatus;
      the second terminal is a "set" terminal for the flip-flop component;
      the fifth output signal is capable of setting the flip-flop component;
      the first terminal is different from the second terminal;
      the fourth output signal is capable of resetting the flip-flop component.

2. The apparatus of claim 1 wherein:
   the seventh output signal is further capable of causing the switch to be turned on for a period of time;
   the timing component is further configured to limit the period of time not to exceed a predetermined duration.

3. The apparatus of claim 1 wherein the second input signal is associated with an error signal.

4. The apparatus of claim 1 wherein the timing component includes a capacitor associated with the time difference.

5. The apparatus of claim 1 wherein the switch is a power switch, the power switch being capable of turning off a power system.

6. A power factor correction apparatus, the apparatus comprising:
   a multiplier component being configured to receive a first input signal and a second input signal and generate a first output signal based on at least information associated with the first input signal and the second input signal, the first input signal being associated with a rectified AC signal;
   a comparator component being configured to receive the first output signal and a third input signal and generate a second output signal based on at least information associated with the first output signal and the third input signal;
   a timing component being configured to receive a fourth input signal at a first time from a flip-flop component and generate a third output signal at a second time based on at least information associated with the fourth input signal;
   an AND gate being configured to receive the second output signal and the third output signal and generate a fourth output signal based on at least information associated with the second output signal and the third output signal;
   a zero current detector being configured to receive a fifth input signal and generate a fifth output signal based on at least information associated with the fifth input signal;
   the flip-flop component being configured to receive the fourth output signal and the fifth output signal and output a sixth output signal;
   a driver component being configured to receive the sixth output signal and output a seventh output signal, the seventh output signal being at least capable of causing a switch to be turned off;
   wherein a time difference between the first time and the second time is predetermined based on at least a characteristic of the apparatus.

7. The apparatus of claim 6 wherein:
the seventh output signal is further capable of causing the switch to be turned on for a period of time;
the timing component is further configured to limit the period of time not to exceed a predetermined duration.

8. The apparatus of claim 6 wherein the second input signal is associated with an error signal.

9. The apparatus of claim 6 wherein the timing component includes a capacitor associated with the time difference.

10. The apparatus of claim 6 wherein the switch is a power switch, the power switch being capable of turning off a power system.

11. A method for providing power factor correction, the method comprising:
receiving a first input signal and a second input signal by a multiplier component;
generating a first output signal based on at least information associated with the first input signal and the second input signal, the first input signal being associated with a rectified AC signal;
receiving the first output signal and a third input signal by a comparator component;
generating a second output signal based on at least information associated with the first output signal and the third input signal;
receiving a fourth input signal at a first time by a timing component from a flip-flop component;
generating a third output signal at a second time based on at least information associated with the fourth input signal;
receiving the second output signal and the third output signal by an AND gate;
generating a fourth output signal based on at least information associated with the second output signal and the third output signal;
receiving a fifth input signal by a zero current detector;
generating a fifth output signal based on at least information associated with the fifth input signal;
receiving the fourth output signal and the fifth output signal by the flip-flop component;
outputting a sixth output signal by the flip-flop component;
receiving the sixth output signal by a driver component;
outputting a seventh output signal by the driver component, the seventh output signal being at least capable of causing a switch to be turned off;
wherein a time difference between the first time and the second time is predetermined based on at least a characteristic of a power factor correction apparatus.

12. The method of claim 11 wherein the process for generating a second output signal based on at least information associated with the first output signal and the third input signal includes comparing the first output signal and the third input signal by the comparator component.

13. The method of claim 11 wherein:
the seventh output signal is further capable of causing the switch to be turned on for a period of time;
the third output signal is capable of limiting the period of time not to exceed a predetermined duration.

14. The method of claim 11 wherein the second input signal is associated with an error signal.

15. The method of claim 11 wherein the fifth output signal is capable of setting the flip-flop component.

16. The method of claim 15 wherein the fourth output signal is capable of resetting the flip-flop component.

* * * * *